United States Patent [19]

Harcuba et al.

[11] 4,135,620

[45] Jan. 23, 1979

[54] ADJUSTABLE CONVEYING DEVICE

[75] Inventors: Siegfried Harcuba, Innsbruck, Austria; Ewald Dussa, Schmelz, Germany

[73] Assignee: Compriforce AG, Chur, Switzerland

[21] Appl. No.: 805,169

[22] Filed: Jun. 9, 1977

[30] Foreign Application Priority Data

Jun. 11, 1976 [AT] Austria .................................. 4249/76

[51] Int. Cl.² ............................................ B65G 21/10
[52] U.S. Cl. .................................... 198/836; 198/627; 198/863; 271/274; 226/172
[58] Field of Search ............... 198/369, 626, 627, 631, 198/836, 863; 271/264, 272, 273, 274; 226/171, 172, 174, 179, 180

[56] References Cited

U.S. PATENT DOCUMENTS 3,516,539  6/1970  Gulstrom et al. .................... 198/836

Primary Examiner—Evon C. Blunk
Assistant Examiner—Jeffrey V. Nase
Attorney, Agent, or Firm—Blanchard, Flynn, Thiel, Boutell & Tanis

[57] ABSTRACT

A device for conveying of sheet materials in strip form to varying destinations. The device is composed of conveying structure for conveying the striplike material from the inlet portion thereof to the outlet portion thereof. Supporting structure is provided for elevating the conveying structure, pivoting the conveying structure about a vertical axis as well as laterally shifting the conveying structure.

10 Claims, 5 Drawing Figures

ADJUSTABLE CONVEYING DEVICE

FIELD OF THE INVENTION

The invention relates to a device for conveying of materials, in particular for conveying of materials to a processing or working machine, comprising a conveyor belt which loops around at least two rollers and a device which is movable simultaneously with said conveyor belt, preferably also a belt which loops around several rollers, for pressing the materials on the conveyor belt.

BACKGROUND OF THE INVENTION

It is known to feed materials to processing or working machines by means of collecting tongs which are operated by electromagnetically or by pneumatically operated hollow cylinders. These known devices are disadvantageous in as far as they are complicated in their structure and furthermore the feed paths are limited. Furthermore, no precise conveying movements can be achieved through these devices, for which reason work with small tolerances cannot be performed or high waste quotas must be accepted. The necessary precision in the movements cannot be achieved with the conventional devices due particularly to a slip-free conveying not being assured and to these devices carrying out uncontrollable movements in the starting phase and the ending phase of the drive motors, in particular during a sudden stop situation.

In addition, it is known to use conveyor belts for the continuous conveying of materials to working and processing machines. The desired precise movements are, however, also not assured as these are necessary in the case of many processes, for example in carrying out of spot welding. It is also not possible with the known belt conveyor devices to feed profiled long forms in a precise feeding manner to working or processing machines.

Finally it is also known to convey materials between an upper and a lower conveyor belt.

Further disadvantages of known devices consist in them not permitting a change in the conveying direction during operation and in them being very noisy due to the play in the joints and the repeated setting down of the jaws on the conveyed material.

Thus the basic purpose of the invention is to provide a conveying device in which the disadvantages, which the known device have, are avoided. This is inventively achieved by the conveyor belt and the holding-down device being supported by a lifting mechanism, a turning mechanism and a carriage so that they can be adjusted in their height and can be pivoted about an axis which is positioned perpendicularly on the plane of the belt and can be adjusted transversely with respect to the conveying direction of the belt and by preferably the conveyor belt and the holding-down device being coupled with one another by means of at least one pressure-medium-fed cylinder.

The rollers which have the conveyor belt looped around them are preferably supported in a frame which is held by the carriage and the guideway for the carriage is supported by the lifting cylinder.

According to further preferred characteristics, the holding-down device is formed by at least one press roll. It can thereby be formed by at least one bar which is constructed with guide and press rolls. In addition, it can be pivotal about a pin which is positioned normally in the plane of the conveyor belt.

In addition, it is possible to provide on the shaft of the driven roller for the conveyor belt a coupling, an advance block and a return block, in addition on the feed side a material-receiving device with a receiving roller, a wiper and a sensor and on or in the machine frame a feed pump for the lifting cylinder and control devices.

BRIEF DESCRIPTION OF THE DRAWINGS

The subject matter of the invention will be discussed more in detail hereinafter in connection with the exemplary embodiments which are illustrated in the drawings, in which.

DETAILED DESCRIPTION

For a better understanding some parts are not illustrated in a portion of the figures.

Figure 2:
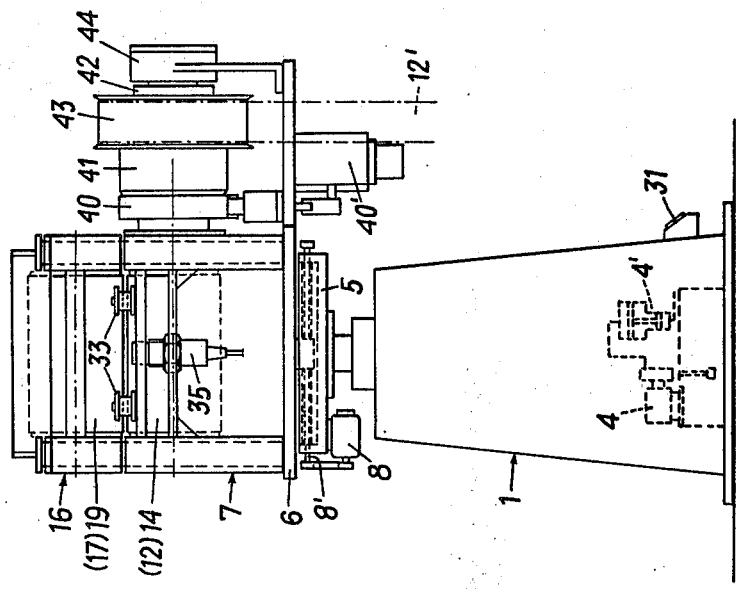
FIGS. 2 and 3 are front and top views of this device.
Figure 1:
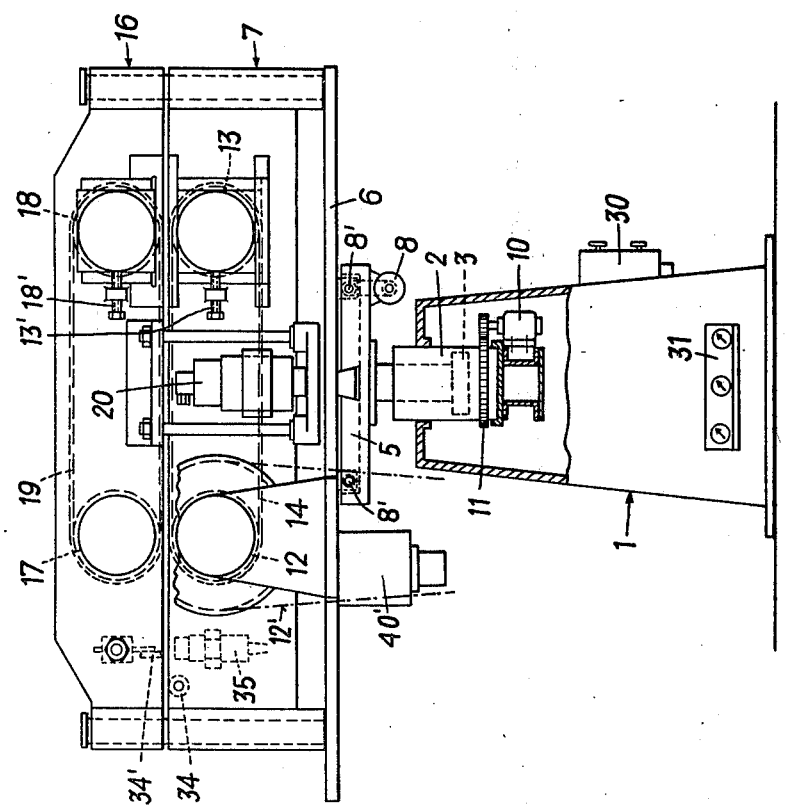
FIG. 1 is a side view of an inventive conveying device, partly broken open.
Figure 3:
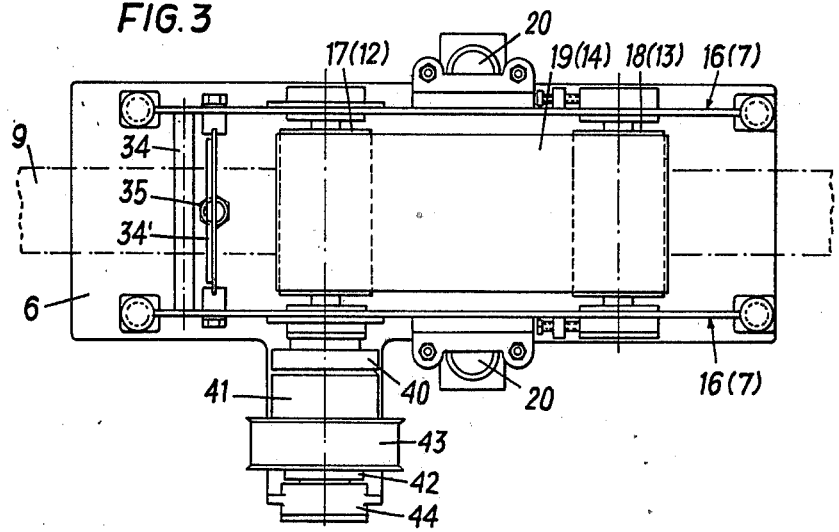

The device according to FIGS. 1 to 3 consists of a carrier 1, in which a hydraulic or pneumatic cylinder 2 is rotatably supported for movement about its longitudinal axis. A motor 10 is used to effect its rotation by cooperating with a gear 11 mounted on the periphery of the cylinder 2. One could instead also provide a conventional lift-swivel cylinder of hydraulic structure connected to the existing hydraulic pipeline and, depending on the control therefor, perform a lift and/or a swivel movement.

A plate 5 is secured to the upper end of the piston 3 of the cylinder 2, on which plate a carriage 6, which serves as a base plate for a frame 7, is movable transversely with respect to the plane of FIG. 1. Two rollers 12 and 13 are supported on this frame 7 and have a conveyor belt 14, which is made for example of plastic or rubber, looped therearound. The belt 14 can have surface-forming reinforcing inserts thereon. Slide bars for the belt are not illustrated. A further frame 16 is arranged above the frame 7, in which frame 16 rollers 17 and 18 are supported and have a belt 19 provided thereon. In addition, belt tensioning devices 13', 18' are associated with two rollers 13 and 18. The two frames 7, 16 can be adjusted and locked in their reciprocal position on both sides of the belts 14 and 19 by means of hydraulic or pneumatic cylinders 20. The cylinders 20 are not illustrated in FIG. 2 of the drawing.

Control devices 30, measuring devices 31, devices 4, 4' for feeding the cylinder 2 and possibly further cylinders are provided on the carrier 1. A drive motor 8 for adjusting the carriage 6 on the plate 5 is, in addition, also provided on the underside of the plate 6. Externally threaded spindles 8' are used for this purpose and are rotatable by means of the motor 8 through a belt drive. The spindles 8' are supported in the plate 5 and are also coupled with one another by means of a belt drive and extend through internally threaded blocks which are secured to the carriage 6. The plate 5 has a guide groove thereon into which extends a guide bar which is arranged on the carriage 6.

A further, controllable motor, which is not illustrated in the drawings, is arranged on the underside of the base plate 6, which motor is connected to the shaft of the roller 12 through a belt drive 12'. On the left side of the base plate 6 (FIG. 1) there is arranged finally a receiving mechanism 33 (FIG. 2), on the front side there is arranged a guide roller 34, and a sensor 35 is supported. Opposite the sensor 35, a wiping device 34' is mounted on the frame 16.

As can be seen from FIG. 2, a control disk 40, which has a magnetic switch 40' associated therewith, a coupling 41 and a belt pulley 43, an advance block 42 and a return block 44 are arranged on the drive shaft of the roller 12.

Operation

This device operates as follows:

It is possible to feed through the receiving device 33 below the wiping device 34' and above the sensor 35 to the belts 14 and 19 a material belt 9 (FIG. 3), such as a strip of sheet stock. As soon as this material has been detected by the sensor 35, the motor for the roller 12 is started to drive the roller. The roller 13 is rotated at the same time also through the belt drive 14. As soon as the material belt 9 becomes positioned between the two belts 14 and 19, the cylinders 20 are loaded by means of a control device to cause the belts 14 and 19 to be pressed on one another. As a result, the material belt 9 is moved with the desired pressure through the belts 14 and 19 for example to a working or processing machine.

By pressing the two belts 14 and 19 onto one another, an exact advance of the material belt is assured and this advance can be controlled in any desired manner by the drive motor, which can be reversed in its direction of rotation. In order to avoid when stopping the conveyor belt, which can be achieved without stopping the motor, further movements of the rollers and of the moving belts winding therearound due to the inertial force, a coupling 41 between the belt pulley 43 and the shaft is released by means of the magnetic switch 40'. The control disk 40 and the advance block 42 or the return block 44 is operated, which causes the shaft to be held. As soon as the control disk 40 is released by the magnetic switch 40' by returning a holding mandrel, the claws of the control disk 40 engage the coupling 41, which causes same to release the advance block 42, arranged at the other end of a pipe-shaped connection, from the drive shaft and the belt pulley 43 will again engage.

The carriage 6 which is guided on the plate 5 is used to feed the material band 9 laterally shifted to the working and processing machine. The amount of the lateral shifting is controllable in both directions by the motor 8. In order to finally be able to feed the material band 9 at an angle or rather at a changed elevational position to the working or processing machines, the cylinder 2 is utilized and the load on the piston 3 will adjust the elevated position of the plate 5 and through rotation the plate 5 and the base plate 6 as well as the frames 7 and 16 and the rollers 12, 13 and 17, 18 and the belts 14 and 19 can be swung.

The wiping device 34 is used to remove foreign matter or dirt which could possibly be stuck on the material band 9. Due to the pressure of the rollers on the material band 9, an absolutely slip-free conveying can be achieved, through which in combination with the advance blocks and return blocks the desired exact movements of the same are assured.

Figure 4:
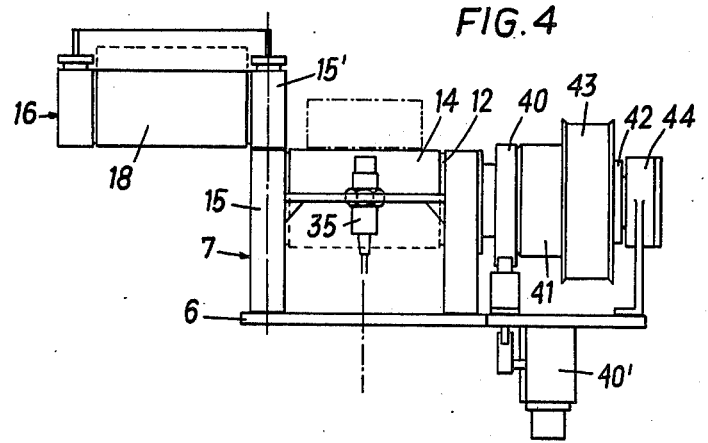
FIGS. 4 and 5 are front views of slightly changed embodiments of an inventive device.

FIG. 4 illustrates a slightly modified embodiment, in which the frame 16 is connected to the rollers 17 and 18 with a bolt 15' rotatably supported in a sleeve 15. In this device, the upper roller arrangement can be swung away from the lower roller arrangement. As a result, an exchange of the conveyor belts can take place in a simple manner. This is particularly important in view of the fact that it has proven to be preferable, for achieving the desired pressing effect, to use conveyor belts having a strength which is greater compared with the material band.

Figure 5:
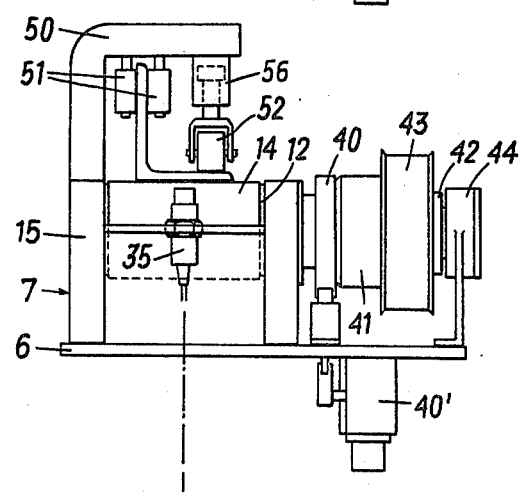

FIG. 5 finally has in place of the upper roller arrangement at least one bar 50 which is fixed in the sleeve 15 and which is equipped with two adjustable guide rollers 51 and a pressure roller 52. The pressure roller 52 can be adjusted by means of a press cylinder 56 with respect to the bar 50.

Profile rods of a working or processing machine can be guided by means of this device.

A precision in movement, which precision cannot be achieved with conventional devices and also in the case where discontinuous movement occurs, is possible, in spite of high conveying speeds, by means of these described conveying devices due to the surface pressure, under the effect of which are the moved materials.

The transverse movability and swingability makes it possible to subject the material to be worked successively to different working processes, which are carried out by working stations which are arranged side-by-side or along an arc or, in the case where a need for a tool exchange exists, the working process does not need to be interrupted, because immediate transfer to another machine can take place.

Due to the voluntary transverse shifting and returning of the material band or rod, it is possible to perform entirely new manufacturing techniques or they can take place at least considerably more economically in order to avoid extremely sensitive multiple compound tools, as they are for example needed in plastic punching. Since a number of existing individual devices for material feed in chipless, chip-removing or autogenous welding or separating processes and other working processes are almost completely replaced by the inventive device, a substantial simplification in the manufacturing technique and reduction in price can be achieved.

The embodiments of the invention in which an exclusive property or privilege is claimed are defined as follows:

1. A device for conveying of materials comprising a conveyor belt which loops around at least two rollers and a holding down means for pressing the materials on the conveyor belt, the improvement comprising wherein the conveyor belt and the holding-down means are supported by a carriage, first means for coupling said conveyor belt and said holding-down means to one another to adjust the distance between the conveyor belt and the holding-down means, a lifting means for adjusting the height of the carriage, the conveyor belt and the holding-down means, a turning means for pivoting the carriage, the conveyor belt and the holding-down means about an axis perpendicular to the plane of the conveyor belt and means to transversely adjust the position of the carriage, the conveyor belt and the holding-down means with respect to the conveying direction of the conveyor belt.

2. The improved device according to claim 1, wherein the rollers are supported in a carrier frame supported on the carriage.

3. The improved device according to claim 1, wherein said means for transversely adjusting the position of the carriage includes a guide for the carriage.

4. The improved device according to claim 1, wherein the holding-down means is formed by at least one press roll.

5. The improved device according to claim 4, wherein the holding-down means is formed by at least one bar, which is constructed with guide and press rolls.

6. The improved device according to claim 1 wherein said holding-down means includes a second conveyor belt which loops around at least two additional rollers.

7. The improved device according to claim 1, including a material-receiving device with a receiving roller, a wiper and a sensor provided on the feed side.

8. The improved device according to claim 1, wherein the holding-down means can be pivoted about the axis of a pin which is positioned normally on the plane of the conveyor belt.

9. The improved device according to claim 1, wherein said first means includes at least one pressure-medium-fed cylinder means.

10. The improved device according to claim 9, including a feed pump for providing said pressure medium to said cylinder means.

* * * * *